US008645523B2

(12) United States Patent
Kim

(10) Patent No.: US 8,645,523 B2
(45) Date of Patent: Feb. 4, 2014

(54) SYSTEM AND METHOD TO MANAGE SET HISTORY FOR SIMPLE NETWORK MANAGEMENT PROTOCOL

(75) Inventor: Geun-tae Kim, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1159 days.

(21) Appl. No.: 11/419,240

(22) Filed: May 19, 2006

(65) Prior Publication Data

US 2007/0156880 A1   Jul. 5, 2007

(30) Foreign Application Priority Data

May 24, 2005  (KR) ................. 10-2005-0043763

(51) Int. Cl.
    *G06F 15/173* (2006.01)
    *G06F 15/16* (2006.01)
(52) U.S. Cl.
    USPC ............................ 709/224; 709/223; 709/217
(58) Field of Classification Search
    USPC ........................................................ 709/224
    See application file for complete search history.

(56) References Cited

U.S. PATENT DOCUMENTS

| | | | | |
|---|---|---|---|---|
| 5,559,958 | A * | 9/1996 | Farrand et al. | 714/27 |
| 6,115,132 | A * | 9/2000 | Nakatsuma et al. | 358/1.14 |
| 6,170,005 | B1 * | 1/2001 | Meandzija | 709/217 |
| 6,175,866 | B1 * | 1/2001 | Holloway et al. | 709/223 |
| 6,178,004 | B1 * | 1/2001 | Ochiai | 358/1.14 |
| 6,539,540 | B1 * | 3/2003 | Noy et al. | 717/141 |
| 6,574,662 | B2 * | 6/2003 | Sugiyama et al. | 709/223 |
| 6,664,978 | B1 * | 12/2003 | Kekic et al. | 715/733 |
| 6,788,315 | B1 * | 9/2004 | Kekic et al. | 715/733 |
| 6,826,166 | B2 * | 11/2004 | Yokoyama | 370/338 |
| 6,930,985 | B1 * | 8/2005 | Rathi et al. | 370/254 |
| 7,099,947 | B1 * | 8/2006 | Nadeau et al. | 709/229 |
| 7,493,378 | B2 * | 2/2009 | Kawashima | 709/223 |
| 2001/0034852 | A1 * | 10/2001 | Kawashima | 714/4 |
| 2005/0251782 | A1 * | 11/2005 | Rodrigues et al. | 717/100 |
| 2007/0204029 | A1 * | 8/2007 | Igarashi et al. | 709/223 |
| 2008/0235374 | A1 * | 9/2008 | Ikeda | 709/224 |

FOREIGN PATENT DOCUMENTS

| | | |
|---|---|---|
| JP | 2001-333072 | 11/2001 |
| JP | 2002-140242 | 5/2002 |
| JP | 2002-149509 | 5/2002 |
| JP | 2002-196996 | 7/2002 |
| JP | 2003-177977 | 6/2003 |
| KR | 2000-39389 | 7/2000 |
| KR | 2001-106966 | 12/2001 |
| KR | 2003-18833 | 3/2003 |
| KR | 2003-58025 | 7/2003 |
| KR | 2004-28400 | 4/2004 |
| KR | 2004-63492 | 7/2004 |
| KR | 2004-107067 | 12/2004 |

* cited by examiner

*Primary Examiner* — Aaron Strange
*Assistant Examiner* — James Edwards
(74) *Attorney, Agent, or Firm* — Stanzione & Kim, LLP

(57) ABSTRACT

A system and method to manage a SET history of a simple network management protocol (SNMP), the system including an SNMP manager to access a network apparatus and to request an object ID, and an SNMP agent to set the object ID in response to the request and to transmit corresponding set information to a plurality of SNMP managers connected to a network so that a set history of the object ID can be stored and managed with respect to each SNMP manager.

11 Claims, 4 Drawing Sheets

SYSTEM AND METHOD TO MANAGE SET HISTORY FOR SIMPLE NETWORK MANAGEMENT PROTOCOL

CROSS-REFERENCE TO RELATED APPLICATIONS

This application claims the benefit of Korean Patent Application No. 2005-43763, filed on May 24, 2005, in the Korean Intellectual Property Office, the disclosure of which is incorporated herein in its entirety by reference.

BACKGROUND OF THE INVENTION

1. Field of the Invention

The present general inventive concept relates to a method of managing a simple network management protocol (SNMP), and more particularly, to a system and method to manage a set history for an SNMP.

2. Description of the Related Art

FIG. 1 illustrates a basic communication operation of an SNMP. Referring to FIG. 1, an SNMP manager manages a network through three types of commands: GET commands, SET commands, and TRAP commands. A GET command allows the SNMP manager to retrieve an object ID from an SNMP agent. A SET command allows the SNMP manager to change the object ID of the SNMP agent. A TRAP command informs the SNMP manager of a specific condition in the SNMP agent or in the network. For example, a TRAP command may be a warning or error message transmitted from the SNMP agent to the SNMP manager to notify the SNMP manager about the SNMP agent's condition. Unlike GET and SET commands, TRAP commands are asynchronous and are not solicited by the SNMP manager.

Referring to FIG. 1, the SNMP manager retrieves an object ID from the SNMP agent using a GET-REQUEST command. In addition, the SNMP manager retrieves a further object ID subsequent to the object ID that the SNMP manager has previously-retrieved, or a subsequent index when the object ID is a table, using a GETNEXT-REQUEST command.

When a GET-RESPONSE command is transmitted by the SNMP agent, the SNMP agent returns the object ID corresponding to the request of the SNMP manager. The SNMP manager requests the SNMP agent to change the object ID using a SET-REQUEST command. The SNMP agent reports a specific condition in the SNMP agent to the SNMP manager using a TRAP command.

FIG. 2 is a flowchart illustrating a procedure in which a conventional SNMP manager sets an object ID. In operation 200, the SNMP manager accesses a network apparatus having an SNMP agent and requests the SNMP agent to set a particular object value using a SET-REQUEST command. In operation 210, an SNMP agent sets the object ID according to the SET-REQUEST of the SNMP manager. In operation 220, the SNMP agent transmits set information corresponding to the set object ID to the SNMP manager using a GET-RESPONSE command.

Conventionally, when an SNMP manager changes or sets an object ID of an SNMP agent on a network using a SET-REQUEST command, the SNMP agent transmits the corresponding set information in a GET-RESPONSE command only to that SNMP manager (i.e., only to the SNMP manager that transmitted the SET-REQUEST to the SNMP agent). Other SNMP managers on the network do not receive the GET-RESPONSE command from the SNMP agent, and therefore do not receive the set information. Although, these other SNMP managers on the network can determine a current object value of the SNMP agent (i.e., the set object value based on the SET-REQUEST), these other SNMP managers cannot obtain past set-information (i.e., set information based on previous SET-REQUEST commands by one or more different SNMP managers). For example, when set information such as the name of a network apparatus that is difficult to memorize has been changed by one or more SNMP managers, it is not known what specific SNMP manager set the changed/current name of the network apparatus. Furthermore, even if the specific SNMP manager that set the changed/current name is known, it is inconvenient to return the name from the changed/current name to a past name because a complicated apparatus name must be directly/manually input into the corresponding SNMP agent.

SUMMARY OF THE INVENTION

The present general inventive concept provides a system and method of storing and managing a set history of an object ID for each SNMP manager by transmitting set information set by an SNMP agent to all SNMP managers connected to a network, thereby overcoming the inconvenience of manually inputting past object ID information, since the past object ID information is not known after the SNMP manager requests the SNMP agent to set an object ID.

Additional aspects and advantages of the present general inventive concept will be set forth in part in the description which follows and, in part, will be obvious from the description, or may be learned by practice of the general inventive concept.

"Set information" refers to various types of information relating to an SNMP manager requesting an SNMP agent to set an object ID. For example, "set information" may include one or more of: an SNMP management information base (MIB) object ID with respect to a host name that has been set, an IP address of the SNMP manager that transmitted the SET-REQUEST command to the SNMP agent, and a time and a date when the host name was set based on the SET-REQUEST. "Set history" refers to a collection of set information for a given SNMP agent, and includes set information resulting from one or more SET-REQUESTS transmitted by one or more SNMP managers to the given SNMP agent.

The foregoing and/or other aspects and utilities of the present general inventive concept may be achieved by providing a system for managing a set history of an SNMP, the system including an SNMP manager to access a network apparatus and to request an object ID, and an SNMP agent to set the object ID in response to the request and to transmit corresponding set information to a plurality of SNMP managers connected to a network.

The SNMP agent may transmit the set information to the plurality of SNMP managers using a TRAP command.

The system may further include a storage unit to store a set history.

The storage unit may be one of a set history log file and a database.

The SNMP manager may include a controller to receive the set information from the SNMP agent and to store the set information in the storage unit.

The SNMP manager may further include a reader to read the set history stored in the storage unit.

The SNMP manager may further include a selector to select an item to be applied from the set history read by the reader; and a controller to request the SNMP agent to set an object ID of the item selected by the selector.

The foregoing and/or other aspects and utilities of the present general inventive concept may also be achieved by providing a method to manage a set history of an SNMP, the method including accessing a network apparatus containing an SNMP agent and requesting an object ID from the SNMP agent using an SNMP manager, and setting the object ID in response to the request and transmitting corresponding set information to a plurality of SNMP managers connected to a network using an SNMP agent.

The transmitting the corresponding set information may include transmitting the corresponding set information to the plurality of SNMP managers using a TRAP command.

The method may further include receiving the set information from the SNMP agent and storing the set information in a storage unit.

The storage unit may store a set history.

The storage unit may be one of a set history log file and a database.

The method may further include reading the set history stored in the storage unit.

The method may further include, selecting an item to be applied from the set history using a SNMP manager, and accessing the network apparatus and requesting the SNMP agent to set an object ID of the selected item.

The foregoing and/or other aspects and utilities of the present general inventive concept may also be achieved by providing a method of managing an SNMP, the method comprising requesting an SNMP agent to set an object ID, setting the object ID, and transmitting corresponding set information to a plurality of networked SNMP managers. The transmitting corresponding set information may transmit using a TRAP command. The method may further comprise storing the set information as set history in one or more of the plurality of networked SNMP managers.

The foregoing and/or other aspects and utilities of the present general inventive concept may also be achieved by providing an SNMP apparatus comprising at least one SNMP agent and a plurality of SNMP managers comprising a plurality of storage units to store set information obtained from the at least one SNMP agent. The at least one SNMP agent may be configured to transmit set information using a TRAP command. At least one of the plurality of storage units may comprise a set history of the SNMP agent.

The foregoing and/or other aspects and utilities of the present general inventive concept may also be achieved by providing a computer readable recording medium, comprising instructions for an SNMP agent to transmit set information to at least one SNMP manager, and instructions for a plurality of SNMP managers to store the set information. The computer readable recording medium may further comprise instructions for the SNMP agent to transmit the set information to the at least one SNMP manager using a TRAP command.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
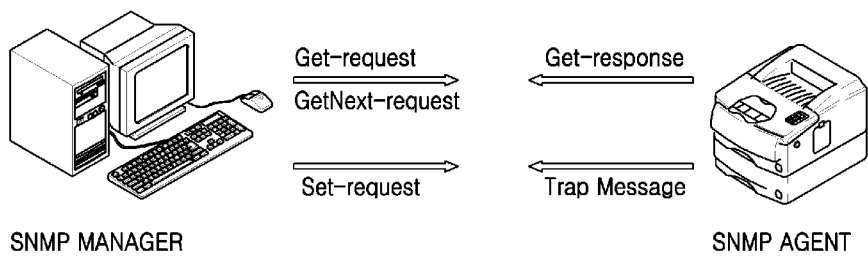
FIG. 1 illustrates a basic communication operation of a simple network management protocol (SNMP)
Figure 2:
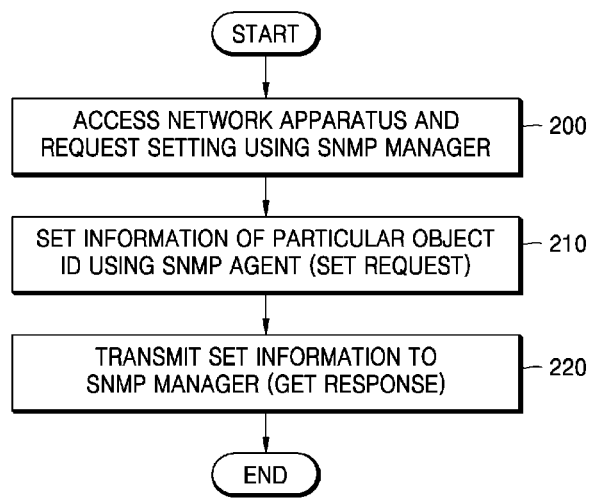
FIG. 2 is a flowchart illustrating a procedure in which a conventional SNMP manager sets an object ID.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 3:
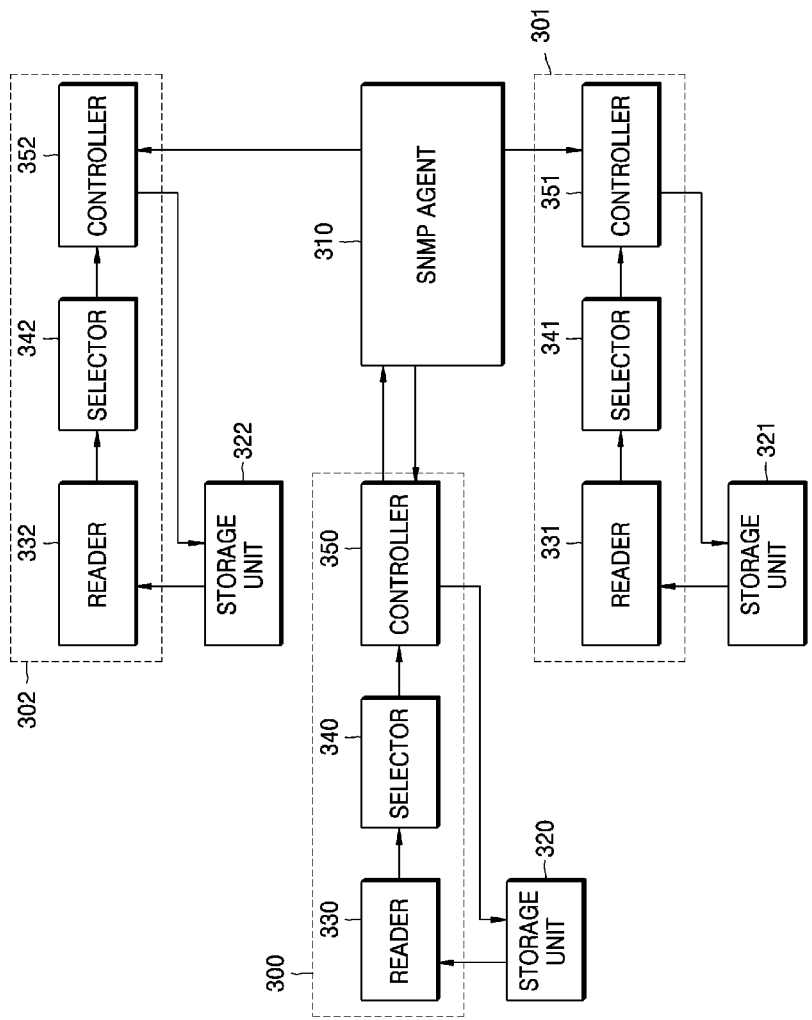
FIG. 3 is a block diagram illustrating a system to manage a set history of an SNMP according to an embodiment of the present general inventive concept.

FIG. 3 is a block diagram illustrating a system to manage a set history of a simple network management protocol (SNMP) according to an embodiment of the present general inventive concept. Referring to FIG. 3, the system includes an SNMP manager 300 and an SNMP agent 310.

The SNMP manager 300 accesses an SNMP agent 310 of a network apparatus and requests the SNMP agent 310 to set an object ID. Since the SNMP manager 300 requests the SNMP agent 310 to set the object ID, a SET-REQUEST command may be used.

In response to the SET-REQUEST, the SNMP agent 310 sets the object ID, thereby changing the object ID from a previous object ID to a changed object ID. The SNMP agent 310 transmits corresponding set information to each of SNMP managers 300, 301, and 302 connected to a network. In this embodiment, the SNMP agent 310 transmits the set information using a TRAP command to each of SNMP managers 300, 301, and 302.

Conventionally, a TRAP command is used by the SNMP agent 310 to report a condition of the SNMP agent 310 (such as a warning or error message) to each of the SNMP managers 300, 301, and 302. For example, when a network resource is used in an amount exceeding a threshold amount, this fact is reported to each of the SNMP managers 300, 301, and 302 by the SNMP agent 310 using a TRAP command. Unlike GET and SET commands, TRAP commands are asynchronous and are not solicited by an SNMP manager. Because the SNMP agent 310 sets the object ID in response to the SET-REQUEST of the SNMP manager 300 (a synchronous command), this situation is not a situation that would be reported by the SNMP agent 310 to the SNMP manager 300 using a TRAP command. In contrast, a GET-RESPONSE instead of a TRAP command would be used by the SNMP agent 310 to report the set information exclusively to the SNMP manager 300.

However, in this embodiment and in contrast to a conventional SNMP, the SNMP agent 310 reports the set information of the object ID to each of the SNMP managers 300, 301, and 302 using a TRAP command so that a set history can be managed for each of the SNMP managers 300, 301, and 302.

Referring to FIG. 3, the system to manage a set history of an SNMP may further include storage units 320, 321, and 322 respectively-connected to the SNMP managers 300, 301, and 302. The storage units 320, 321, and 322 store a set history for the SNMP agent 310. The storage units 320, 321, and 322 may be included within the respective SNMP managers 300, 301, and 302, or externally-connected thereto. The storage units 320, 321, and 322 may be implemented in a form of a set history log file or a database.

The SNMP managers 300, 301, and 302 may also respectively include readers 330, 331, and 332, selectors 340, 341, and 342, and controllers 350, 351, and 352. The readers 330, 331, and 332 respectively read a set history or set histories stored in the storage units 320, 321, and 322.

Figure 5:
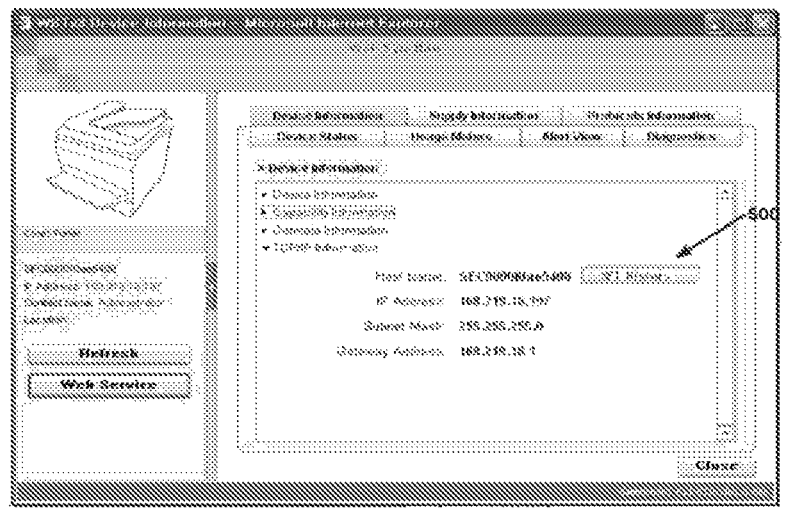
FIG. 5 illustrates a user interface to execute a function of a reader according to an embodiment of the present general inventive concept.

FIG. 5 illustrates a user interface to execute a function of the readers 330, 331, and 332 according to an embodiment of the present general inventive concept. Referring to FIG. 5, device information of a printer can be viewed on the user interface. In detail, the user interface displays an Internet Protocol (IP) address, a subnet mask, and a gateway address, which correspond to a host name (SEC0000f0ae5408). When a set history button 500 implementing the reader 330, 331, or 332 is clicked, a host will read the set history of the SNMP agent 310 from the storage unit 320, 321, or 322.

The selectors 340, 341, and 342 select an item to be applied from the set history read from the readers 330, 331, and 332, respectively.

Figure 6:
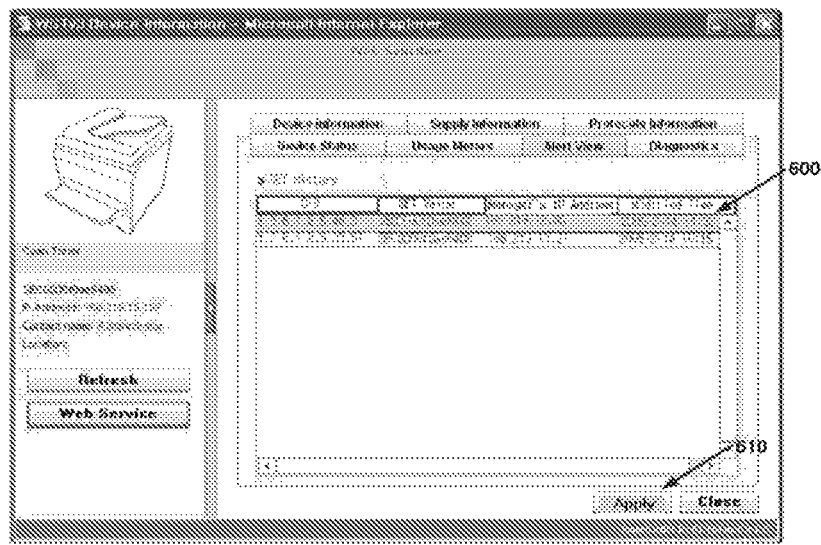
FIG. 6 illustrates a user interface to execute a function of a selector according to an embodiment of the present general inventive concept.

FIG. 6 illustrates a user interface to execute a function of the selectors 330, 331, and 332 according to an embodiment of the present general inventive concept. When the set history button 500 illustrated in FIG. 5 is clicked, a set history is displayed on the user interface illustrated in FIG. 6. Here, "OID" is an SNMP management information base (MIB) object ID with respect to a host name that has been set and a "Set value" is a value of the host name. "Manager's IP address" is an IP address of a SNMP manager that made a SET-REQUEST. "Modified time" indicates a time and a date when the host name was set based on a SET-REQUEST.

When a desired item in a set history is clicked, the item (e.g., an inverted region 600) is selected. Thereafter, when an apply button is clicked, device information corresponding to the selected item is selected.

The controllers 350, 351, and 352 store messages received from the SNMP agent 310 in the storage units 320, 321, and 322, respectively. In addition, the controllers 350, 351, and 352 request the SNMP agent 310 to set object IDs of items selected by the selectors 340, 341, and 342, respectively.

Figure 4:
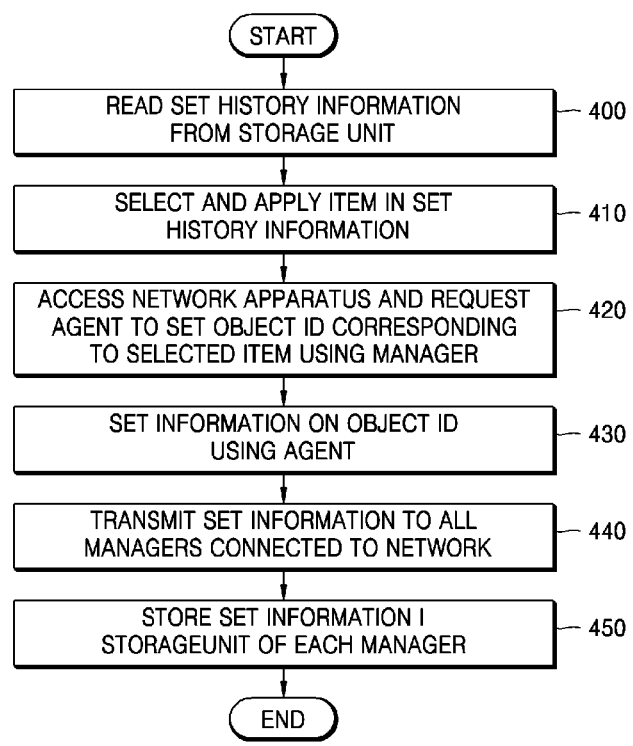
FIG. 4 is a flowchart illustrating a method to manage a set history of an SNMP according to an embodiment of the present general inventive concept.

FIG. 4 is a flowchart illustrating a method of managing a set history of an SNMP according to an embodiment of the present general inventive concept. The method illustrated in FIG. 4 will be described with reference to FIG. 3.

Referring to FIGS. 3 and 4, when one of the SNMP managers 300, 301, and 302 (e.g., the SNMP manager 300) changes an object ID of the SNMP agent 310, in operation 400 the reader 330 reads set history information from the storage unit 320 and displays the set history on a screen. In operation 410, an item to be set is selected from the set history and is applied using the selector 340. In operation 420, the controller 350 of the SNMP manager 300 accesses a network apparatus containing the SNMP agent 310, and requests the SNMP agent 310 to set an object ID corresponding to the item selected by the selector 340. In operation 430, the SNMP agent 310 sets the object ID according to the request. In operation 440, the SNMP agent 310 transmits the set information to each of the SNMP managers 300, 301, and 302 connected to the network using a TRAP command. In operation 450, upon receiving the set information of the object ID through the TRAP command, the controllers 350, 351, and 352 of the respective SNMP managers 300, 301, and 302 store the set information in the storage units 320, 321, and 322, respectively.

Embodiments of the present general inventive concept can be written as computer programs and can be implemented in general-use digital computers that execute the programs using a computer readable recording medium. Examples of the computer readable recording medium include magnetic storage media such as ROM, floppy disks, hard disks, etc., optical recording media such as CD-ROMs and DVDs, and storage media.

According to the present general inventive concept, when an SNMP manager requests an SNMP agent to set an object ID, the SNMP agent sets the object ID and transmits set information to all SNMP managers connected to a network so that a set history of the object ID can be stored and managed with respect to each SNMP manager. Accordingly, an SNMP manager can easily select and reset information in the SNMP agent that the SNMP manager had not previously-set (i.e., information that had been previously-set by another, different, SNMP manager).

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A system to manage a set history of an SNMP (Simple Network Management Protocol), the system comprising:
   an SNMP manager device to access a network apparatus and to request setting an object ID;
   an SNMP agent device to set the object ID in response to the request and to transmit corresponding set information to a plurality of SNMP manager devices connected to a network, where the transmitted corresponding set information is stored in each of the SNMP manager devices of the plurality of the SNMP manager devices that receive the corresponding set information; and
   a storage unit that is a set history log file to store a set history of previous and changed object IDs,
   wherein the SNMP manager device comprises a controller to receive the set information from the SNMP agent device and to store the set information in the storage unit, and a reader to read the set history stored in the storage unit, and
   wherein the SNMP manager device further comprises a selector to select an item to be applied from the set history read by the reader, and the controller to request the SNMP agent device to set an object ID of the item selected by the selector.

2. The system of claim 1, wherein the SNMP agent device transmits the set information to the plurality of SNMP devices using a TRAP command.

3. The system of claim 1, wherein the storage unit is a database.

4. A method of managing a set history of an SNMP (Simple Network Management Protocol), the method comprising:
   accessing a network apparatus containing an SNMP agent and requesting an object ID from the SNMP agent using an SNMP manager;
   setting the object ID in response to the request and transmitting corresponding set information to a plurality of SNMP managers connected to a network using an SNMP agent and storing the transmitted corresponding set information from the SNMP agent in each of the SNMP manager devices of the plurality of the SNMP manager devices that receive the set information;
   receiving the set information from the SNMP agent and storing the set information in a storage unit that is a set history log file with a set history of previous and changed object IDs;

selecting an item to be applied from the set information stored in the storage unit using a SNMP manager; and accessing the network apparatus and requesting the SNMP agent to set an object ID of the selected item.

5. The method of claim 4, wherein the transmitting the corresponding set information transmits the corresponding set information to the plurality of SNMP managers using a TRAP command.

6. The method of claim 4, wherein the storage unit is a database.

7. A method of managing an SNMP (Simple Network Management Protocol), the method comprising:
 requesting an SNMP agent to set an object ID;
 setting the object ID;
 transmitting corresponding set information to a plurality of networked SNMP managers from the SNMP agent;
 storing the received set information from the SNMP agent as set history of previous and changed object IDs in each of the plurality of networked SNMP managers that receive the transmitted corresponding set information as a set history log file;
 selecting an item to be applied from the stored set history using at least one SNMP manager of the plurality of SNMP managers; and
 requesting the SNMP agent to set an object ID of the selected item.

8. The method of claim 7, wherein:
 the transmitting corresponding set information transmits using a TRAP command.

9. An SNMP (Simple Network Management Protocol) apparatus, comprising:
 at least one SNMP agent device to transmit corresponding set information; and
 a plurality of SNMP manager devices, each comprising at least one storage unit to store set information received from each of the at least one SNMP agent device as a set history log file, the at least one storage unit comprising a set history of previous and changed object IDs of the at least one SNMP agent device,
 wherein at least one of the plurality of SNMP manager devices further comprises a selector to select an item to be applied from the set history loq file stored in the at last one storage unit, and to request the at least one SNMP agent device to set an object ID of the item selected by the selector.

10. The apparatus of claim 9, wherein:
 the at least one SNMP agent device is configured to transmit set information using a TRAP command.

11. A method of managing an SNMP (Simple Network Management Protocol), the method comprising:
 receiving set information transmitted from at least one SNMP agent device;
 storing set information history received from the at least one SNMP agent device as a set history log file as part of a set history of previous and changed object IDs in each SNMP manager device of a plurality of SNMP manager devices;
 selecting an item to be applied from the stored set information history using at least one of the SNMP manager devices; and
 requesting the SNMP agent to set an object ID of the selected item.

* * * * *